UNITED STATES PATENT OFFICE

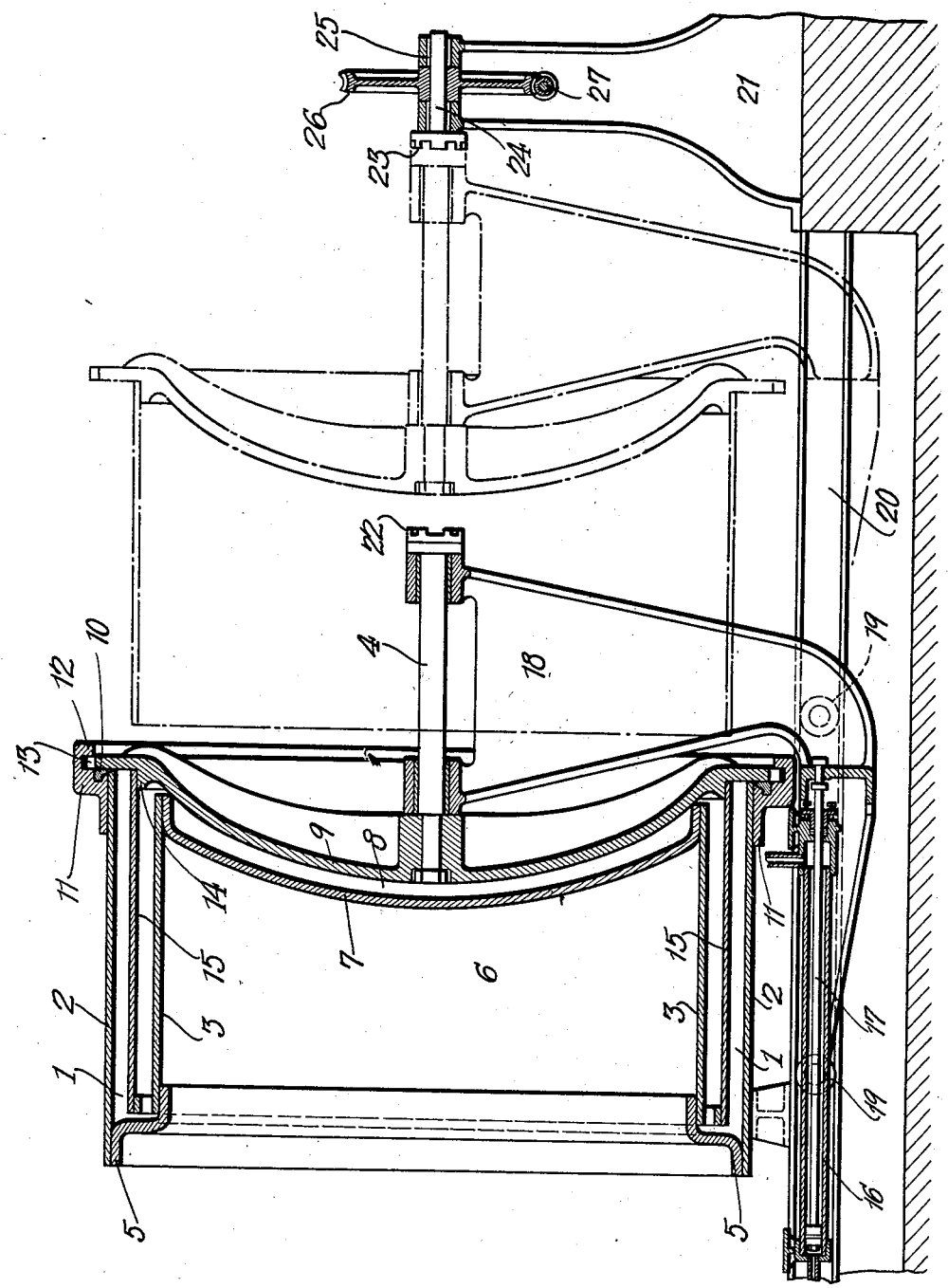

HARRY WILLSHAW, OF WYLDE GREEN, AND WALTER GEORGE GORHAM, OF ERDINGTON, BIRMINGHAM, ENGLAND, ASSIGNORS TO DUNLOP RUBBER COMPANY LIMITED, OF BIRMINGHAM, ENGLAND, A BRITISH CORPORATION

VULCANIZING APPARATUS

Application filed December 27, 1929, Serial No. 416,788, and in Great Britain January 1, 1929.

This invention concerns improvements in or relating to apparatus for vulcanizing rubber and is particularly applicable to the vulcanization of sheet rubber in long lengths or strips.

The invention has for its object the provision of apparatus which is more economical of the heating energy and fluid required for vulcanizing and is more easily and expeditiously operated and which can deal efficiently with longer lengths of material than heretofore known to be possible with existing apparatus.

According to this invention we provide apparatus for vulcanizing lengths or sheets of rubber or of rubberized material comprising a vulcanizing chamber formed between spaced shells together with means for supporting and sealing the material to be vulcanized within the chamber and mechanism for moving the supporting and sealing means so as to be rotatable externally of the chamber.

The drum is preferably provided with a central shaft, the drum and shaft being supported in a carriage having rollers to guide the axial movement from the internal or vulcanizing position to the external or winding on and off position, the drum or carriage being either or both axially moved or rotated by manual or power operated means such as a double action hydraulic cylinder and piston connected to the carriage.

In order that our invention may be more easily understood and readily carried into effect, the same will now be described with reference to the accompanying drawing, which is a part sectional side view of the apparatus.

The vulcanizing chamber 1 is formed between two concentric shells 2 and 3 sealed at the outer end by a permanent fluid proof joint 5.

Fluid is prevented from entering the space 6 by a member 7 forming a peripheral fluid seal with the inner member 3. The additional fluid containing space 8 formed between the member 7 and the door 9 is sealed by a flexible ring 10 of resilient fluid proof material such as rubber with or without fabric reinforcement housed in a peripheral member 11 suitably attached to the outer shell 2. This member 11 is provided with catchers 12 at intervals engaging projections 13 upon the door 9.

The door 9 is formed at 14 to support a cylindrical surface 15 within and between the shells 2 and 3 forming the vulcanizing chamber.

The cylindrical surface 15 may be formed of rods or of openwork formation to reduce weight and to allow free action of the fluid upon the material wound upon it.

To wind the strip or sheet to be cured upon the surface 15 the door 9 is rotated until the catches 12 are disengaged and fluid is admitted to the double action cylinder 16 through suitable valves, whereupon the piston 17 moves the carriage 18 away from the vulcanizing vessel.

The carriage 18 comprises a rotatable shaft 4 supported by two members provided with rollers 19 revolving in guide rails 20.

The drum 15 is thus carried by the door 9 supported by the carriage 18 towards a pedestal bearing 21.

The shaft 4 is provided at its outer end with suitable teeth 22 interlocking when in the dotted position with similar teeth 23 carried upon one end of a rotatable shaft 24 in a bearing 25 upon the pedestal 21. Keyed to the shaft 24 is a worm wheel 26 rotated by a worm 27, but the shaft 4 may be rotated in any convenient manner.

Suitable inlet and outlet valves not shown may be provided for filling and emptying the curing space prior to vulcanization and removal of the cured material from the vessel.

While we have described quite specifically the embodiment of the invention herein illustrated it is not to be construed that we are limited thereto since various modifications may be made without departing from the invention as defined in the appended claims.

What we claim is:

1. An apparatus for vulcanizing lengths or sheets of rubber or rubberized material comprising inner and outer shells spaced to form an annular vulcanizing chamber, a fixed closure for one end of said chamber, a movable closure for the opposite end thereof and supporting means for the material carried by said movable closure.

2. An apparatus for vulcanizing lengths or sheets of rubber or rubberized material comprising inner and outer shells spaced to form an annular vulcanizing chamber, a fixed closure for one end of said chamber, a movable closure for the opposite end thereof and supporting means for the material carried by said movable closure and power means for moving the latter.

3. An apparatus for vulcanizing lengths or sheets of rubber or rubberized material comprising inner and outer shells spaced to form an annular vulcanizing chamber, a fixed closure for one end of said chamber, a movable closure for the opposite end thereof, means for rotatably supporting said closure and a material support carried by said closure.

4. An apparatus for vulcanizing lengths or sheets of rubber or rubberized material comprising inner and outer shells spaced to form an annular vulcanizing chamber, a fixed closure for one end of said chamber, a movable closure for the opposite end thereof, means for rotatably supporting said closure and a material support carried by said closure, a carriage for said rotatable supporting means and means for moving said carriage.

5. An apparatus for vulcanizing lengths or sheets of rubber or rubberized material comprising inner and outer shells spaced to form an annular vulcanizing chamber, a fixed closure for one end of said chamber, a movable closure for the opposite end thereof, a longitudinally movable carriage having a supporting shaft for said movable closure member, and rotary drive mechanism engageable with said shaft upon movement of said carriage.

6. The apparatus of claim 5 wherein the carriage has rollers, and the apparatus includes fixed guides which coact with said rollers.

In witness whereof, we have hereunto signed our names.

HARRY WILLSHAW.
WALTER GEORGE GORHAM.